UNITED STATES PATENT OFFICE.

JONATHAN SCHARR, OF PHILADELPHIA, PENNSYLVANIA.

MATERIAL TO BE USED AS A SUBSTITUTE FOR OIL IN THE PREPARATION OF WOOL FOR CARDING AND SPINNING.

SPECIFICATION forming part of Letters Patent No. 268,547, dated December 5, 1882.

Application filed August 28, 1882. (No specimens.) Patented in England February 22, 1879, No. 728.

*To all whom it may concern:*

Be it known that I, JONATHAN SCHARR, a citizen of Germany, residing at Philadelphia, in the county of Philadelphia and State of Pennsylvania, have invented certain new and useful Improvements in Material to be used as a Substitute for Oil in the Preparation of Wool or other Fibers for Carding and Spinning; and I do declare the following to be a full, clear, and exact description of the invention, such as will enable others skilled in the art to which it appertains to make and use the same.

My invention relates to manufacturing or making a material which I call a "soap-cream," to be used as a substitute for oil in the preparation of wool or other fibers for carding, spinning, and manufacturing purposes.

My soap-cream consists of the following ingredients, viz: water, forty gallons; Marseilles soap or any other pure white olive-soap made with pearlash, fifty-five pounds; carbonate of soda or carbonate of potash free of caustic, six pounds four ounces; borax, three pounds eight ounces; pearlash or calcined soda, six pounds four ounces; olive, lard, neat's-foot, or any other good fatty oil, one hundred and seventy-five pounds; thao, (Chinese or Japanese isinglass,) two pounds nine ounces; salicylic acid, nine ounces; glycerine, thirty-seven pounds.

The method of preparing is as follows, viz: In the forty gallons of water I place the soap, carbonate of soda or potash, pearlash, and borax in about the proportions named, and boil them for about two hours, after which I add the oil and boil for a short time longer. During the boiling of the above-named ingredients I dissolve the thao or isinglass and gum-tragacanth by steeping and boiling them. After and when dissolved I mix salicylic acid and glycerine with the thao and gum-tragacanth. Then add these dissolved and mixed ingredients with those previously boiled and leave the whole to cool, stirring meanwhile until thoroughly mixed. The material is then ready for use, and is applied to the wool or other fibers in the same manner as oil.

The proportions of the materials herein named and the manner of preparing the cream as herein set out give the best average results; but both may be varied somewhat, harsh and wiry wool requiring more or a heavier oil. The glycerine may be omitted in working some kinds of wool, and in that case the quantity of oil is increased correspondingly. The cream may be made without pearlash or soda, if a larger quantity of soap is used. The soap may also be omitted, if more soda or pearlash is used, and body given to the material by adding more Irish moss or isinglass, or both. I do not therefore confine myself to the exact proportions and quantities herein named.

In manufacturing establishments it is generally more convenient to boil these ingredients by the injection of steam, and the proportions herein given are based upon that method of boiling. The quantities of the materials named will make about one thousand pounds of the cream, and if the boiling is done by heat and not steam more water should be added to bring the batch up to the required weight.

The material called "thao" is made from Japanese isinglass, and is of the same nature, but reduced to a powder.

Having thus described my invention, what I claim, and desire to secure by Letters Patent of the United States, is—

1. The herein-described composition of matter to be used as a substitute for preparing wool and other fibers for carding, spinning, and manufacturing generally, consisting of water, soap, carbonate of soda or carbonate of potash, borax, pearlash or calcined soda, oil, thao or isinglass, salicylic acid, and glycerine, all substantially as described.

2. The herein-described composition of matter, consisting of water, carbonate of soda or carbonate of potash, borax, pearlash or calcined soda, oil, thao or isinglass, or Irish moss, and salicylic acid, combined and prepared substantially as and for the purpose set forth.

3. The herein-described composition of matter, consisting of water, soap, carbonate of soda or carbonate of potash, borax, oil, thao or isinglass, and salicylic acid, all combined and prepared substantially as and for the purpose set forth.

In testimony whereof I affix my signature in presence of two witnesses.

JONATHAN SCHARR.

Witnesses:
THOMAS D. MOWLDS,
JOS. J. KNOX.